A. BALBO-BERTONE.
AGRICULTURAL MACHINE.
APPLICATION FILED OCT. 23, 1909.
1,046,940.
Patented Dec. 10, 1912.
3 SHEETS—SHEET 3.
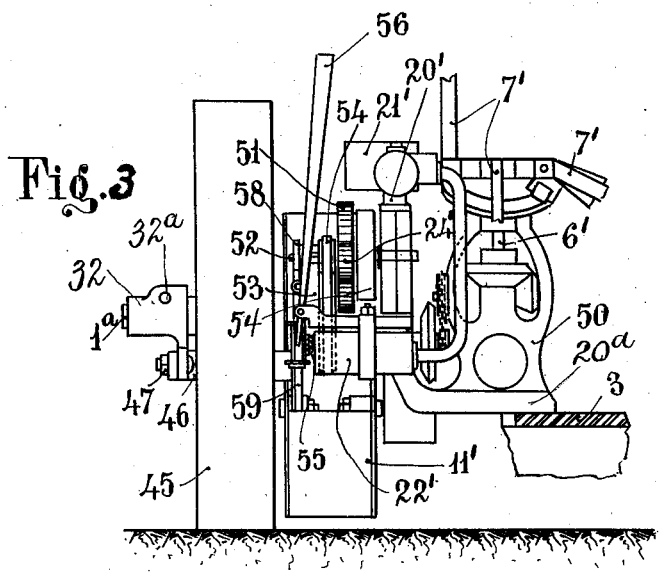
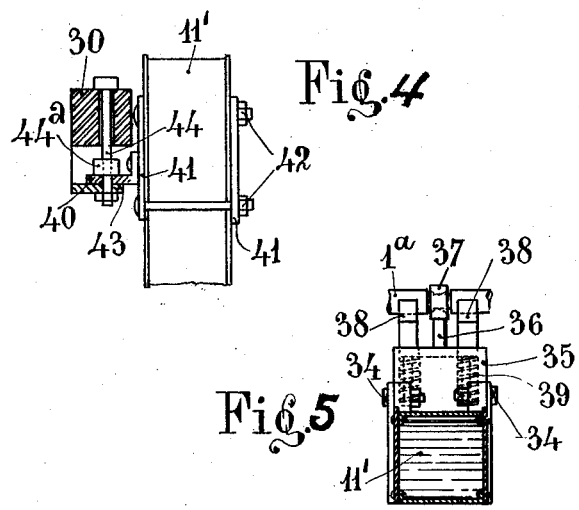
Witnesses
B. Donners
May Ellis
Inventor
Alfonso Balbo-Bertone
by Henry Orth
Atty

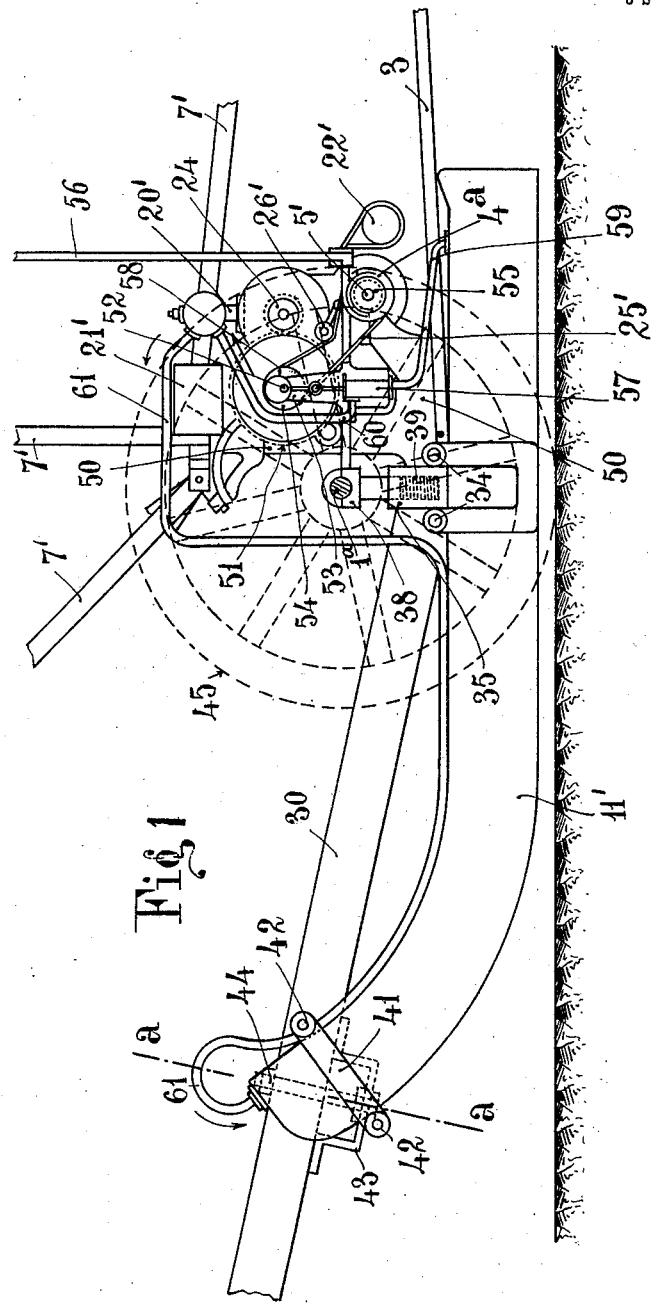

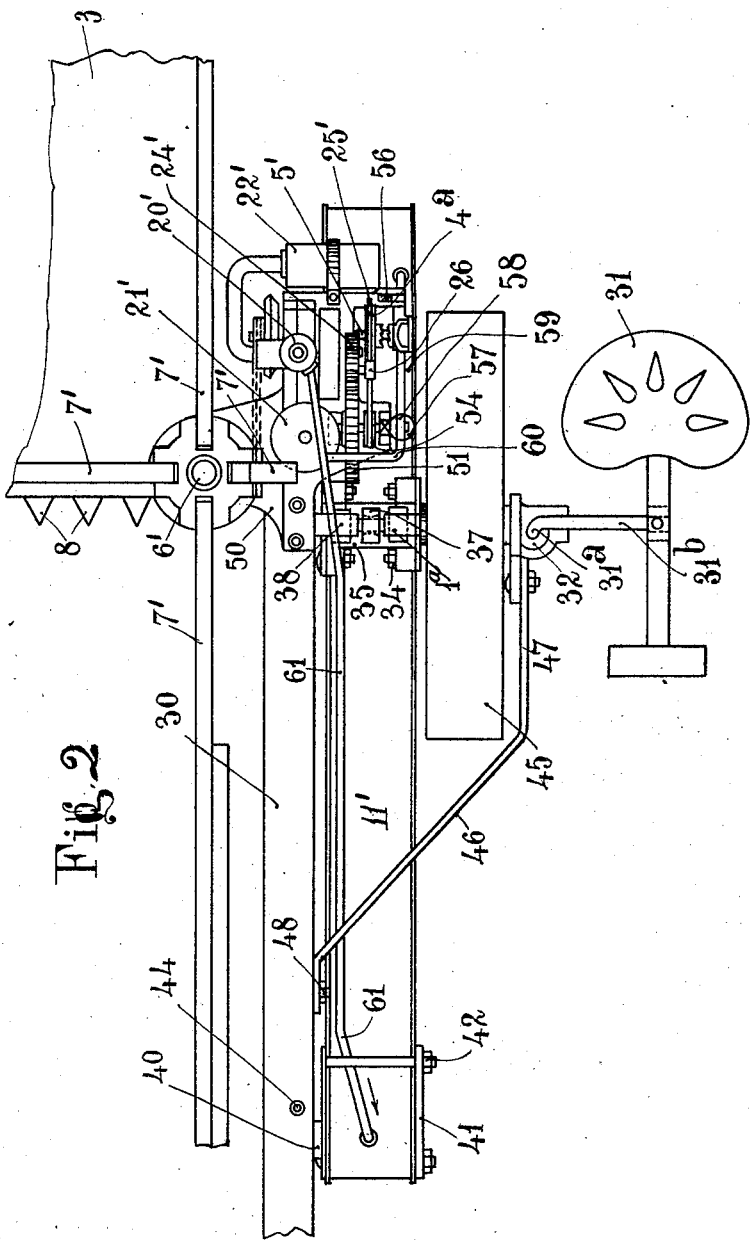

UNITED STATES PATENT OFFICE.

ALFONSO BALBO-BERTONE, OF CRESCENTINO, ITALY.

AGRICULTURAL MACHINE.

1,046,940. Specification of Letters Patent. Patented Dec. 10, 1912.

Application filed October 23, 1909. Serial No. 524,264.

*To all whom it may concern:*

Be it known that I, ALFONSO BALBO-BERTONE, a subject of the King of Italy, residing at Villa Cerrone, Crescentino, Province of Novara, Piedmont, Italy, have invented certain new and useful Improvements in Agricultural Machines, of which the following is a specification.

The present invention has for its object to provide agricultural implements in general and more particularly reaping and mowing machines, which are worked by a mechanically driven engine while the draft thereof is effected by animal power, with a supporting slide for the purpose of adapting said machines to work in the moors, rice-fields, and the like, by preventing them from sinking in the ground, while carrying wheels may be applied for traveling on the ordinary roads and various kinds of soil.

The invention is illustrated in the annexed drawings in connection with a reaping machine.

Figure 1 is a side elevation of the central part of a reaping machine, the supporting wheel being for the sake of clearness shown only in dotted lines, while the driver's seat is omitted. Fig. 2 is a plan and Fig. 3 a rear elevation of the central part of said reaping machine. Fig. 4 is a section on line $a-a$, Fig. 1, and Fig. 5 is a detail view of the slide and its rear supporting mechanism.

As this invention may be applied to any type of well known reaping machine, the construction of this latter will not be described as it forms no part of this invention. It will only be noted that in the ordinary reaping machines, a wheel 45 is fitted on the main shaft $1^a$ and serves together with a wheel (not shown) placed laterally at the end on the table 3 to support the whole machine.

In the form of the reaping machine illustrated, the engine working the operating part of the machine is mounted on the machine frame. The slide which does not directly support the engine is capable of oscillating to fit the unevenness of the ground, and is constituted by a tank containing the cooling water for the engine and acts therefore as a radiator. The machine and slide are supported by a wheel arranged as in the usual reaping, mowing, and the like machine, but having a smaller breast width, said wheels serving substantially to facilitate the travel of the machine on ordinary grounds.

The slide 11', is connected to the main shaft $1^a$ by means of a rod 36 fixed in a bearing block 35 which is secured by bolts 34 to the slide, said rod being connected to the shaft by an eye or loop 37 formed on the upper end of the rod, the two ends of the eye being made larger than the middle portion so that the rod may oscillate on the shaft. On each side of the connecting rod 36 is mounted a bearing post 38 which rests on a spring 39 within the block and is pressed upward against the shaft. It will thus be seen that the slide may, by means of the formation of the eye 37, oscillate on the shaft and be returned to its normal position by means of the spring urged posts 38. The slide is suspended at its front end from the steering bar or tongue 30 of the machine by means of a coupling piece 40 fixed on a stirrup 41, which is secured to the slide by bolts 42, said coupling piece being slidably connected to a bracket 43 on the underside of the tongue 30, by means of a coupling pin 44, the latter being provided with a sliding sleeve $44^a$ for diminishing the displacement of the coupling piece 40 on the pin 44.

On the end of the shaft $1^a$ is threaded a sleeve 32, any displacement of this latter being prevented by means of a cross bar 46 bolted thereon at 47 and to the steering bar at 48. The end $31^a$ is bent at right angles to the rod $31^b$ of the driver's seat 31, and enters a hole $32^a$ of the sleeve 32.

The engine 20' is mounted by means of its base plate $20^a$ on the central front portion of the frame 50 of the machine, said frame supporting the operating members of the machine and more particularly the vertical shaft 6' of the rakes 7'. From said engine 20' the motion is transmitted by means of a couple of toothed wheels 24', 51 to the side shaft 52 rotating within supporting pieces 53 of the base plate $20^a$ of the engine. On the side shaft 52 is fitted a pulley or chain wheel 54 from which motion is transmitted through a belt or chain 25' to the pulley or chain wheel $4^a$ loosely mounted on the shaft 5' through which all the operating members of the machine are worked. When the machine is in operation, said pulley $4^a$ will be attached to the shaft 5' by means of a clutch 55 operated by a lever 56. The tension of the belt 25' may be adjusted by means of the tension pulley 26'.

It will be seen that the load of the engine is wholly supported by the frame of the machine and does not weigh on the slide, which is thus free to adjust itself to the ground.

21' indicates the fuel tank, 22' the silencer and 57 the pump effecting the circulation of the water in the engine jacket. Said pump is operated by the eccentric 58 fitted on the shaft 52. From the tube 59, the water contained in the slide 11' is sucked by the pump 57 and conveyed through the pipe 60 into the engine jacket from which it flows warmed up through the tube 61 to the opposite higher end of the cooling slide 11', through the large metallic walls of which the heat is radiated.

I claim—

1. In an agricultural implement, the combination with the supporting wheels thereof, of a runner, an oscillatory rod connecting the runner to the axle of the implement and supporting said runner slightly above the tread of the supporting wheels, rods mounted on the runner on each side of the connecting rod, and springs to yieldingly hold the side rods in contact with said axle.

2. In an agricultural implement, the combination with the supporting wheels thereof, of a runner, an oscillatory rod connecting the runner to the axle of the implement and supporting said runner slightly above the tread of the supporting wheels, rods mounted on the runner on each side of the connecting rod, springs to yieldingly hold the side rods in contact with said axle, and means to adjustably connect the front end of the runner to the implement.

In testimony that I claim the foregoing as my invention, I have signed my name in presence of two subscribing witnesses.

ALFONSO BALBO-BERTONE.

Witnesses:
FRANCESCO SIMONI,
PIERE GIANOLIO.

---

Copies of this patent may be obtained for five cents each, by addressing the "Commissioner of Patents Washington, D. C."